US012462616B2

United States Patent
Yamada et al.

(10) Patent No.: US 12,462,616 B2
(45) Date of Patent: Nov. 4, 2025

(54) INFORMATION PROCESSING DEVICE, VEHICLE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yoshihisa Yamada, Nagoya (JP); Hiroshi Ueno, Toyota (JP); Takahiro Tsuji, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/214,872

(22) Filed: Jun. 27, 2023

(65) Prior Publication Data

US 2024/0021025 A1   Jan. 18, 2024

(30) Foreign Application Priority Data

Jul. 14, 2022  (JP) ................................. 2022-113194

(51) Int. Cl.
*G07C 5/00* (2006.01)
*B62D 15/02* (2006.01)
*G07C 5/08* (2006.01)

(52) U.S. Cl.
CPC .......... *G07C 5/006* (2013.01); *B62D 15/021* (2013.01); *G07C 5/0808* (2013.01)

(58) Field of Classification Search
CPC ..... G07C 5/006; G07C 5/0808; B62D 15/021
See application file for complete search history.

(56) References Cited

U.S. PATENT DOCUMENTS

| | | | |
|---|---|---|---|
| 5,670,716 A | 9/1997 | Tamasho et al. | |
| 5,771,480 A * | 6/1998 | Yanase ................. | B60C 23/061 73/146 |
| 5,907,097 A | 5/1999 | Nakajima | |
| 6,076,035 A | 6/2000 | Yanase | |
| 2003/0080863 A1 | 5/2003 | Oshiro et al. | |
| 2003/0192375 A1 | 10/2003 | Sugai et al. | |
| 2015/0232120 A1* | 8/2015 | Aono ..................... | B62D 6/002 701/42 |
| 2023/0162541 A1 | 5/2023 | Yamada et al. | |

FOREIGN PATENT DOCUMENTS

| | | |
|---|---|---|
| JP | H11-78442 A | 3/1999 |
| JP | 2002-221527 A | 8/2002 |
| JP | 2003-165318 A | 6/2003 |
| JP | 2019-190959 A | 10/2019 |
| JP | 2023-075502 A | 5/2023 |
| JP | 2023-082863 A | 6/2023 |
| KR | 1020070018704 A | 2/2007 |
| KR | 10-2018-0053885 A | 5/2018 |

* cited by examiner

*Primary Examiner* — Andrew J Cromer
(74) *Attorney, Agent, or Firm* — Oliff PLC

(57) ABSTRACT

An information processing method includes determining whether at least one condition is satisfied, and calculating a feature quantity on flexibility of a tire when all of the at least one condition is satisfied. The at least one condition includes at least one of a first condition that an absolute value of an angular velocity of a steering wheel is smaller than a first reference value, and a second condition that an absolute value of a vector sum of vehicle accelerations of the vehicle including the steering wheel and wheels each provided with the tire is smaller than a second reference value.

7 Claims, 8 Drawing Sheets

INFORMATION PROCESSING DEVICE, VEHICLE, INFORMATION PROCESSING METHOD, AND NON-TRANSITORY STORAGE MEDIUM

CROSS-REFERENCE TO RELATED APPLICATION

This application claims priority to Japanese Patent Application No. 2022-113194 filed on Jul. 14, 2022, incorporated herein by reference in its entirety.

BACKGROUND

1. Technical Field

The present disclosure relates to an information processing device, a vehicle, an information processing method, and a non-transitory storage medium.

2. Description of Related Art

Japanese Unexamined Patent Application Publication No. 2002-221527 (JP 2002-221527 A) discloses a device that accurately detects wear condition of a tire. This device detects the wear condition of the tire according to the average value of linear regression coefficients of acceleration/deceleration of a vehicle and a slip ratio of front and rear wheels.

SUMMARY

In general, various sensors are attached to vehicles. It is conceivable to estimate state changes of vehicle parts based on data acquired from these sensors. In particular, tires may undergo state changes due to their deterioration (wear), replacement, and the like. Therefore, there is a demand for estimating changes in a state of tires with high accuracy (see, for example, JP 2002-221527 A).

The present disclosure provides a technique for estimating a change in a tire state with high accuracy.

A first aspect of the present disclosure relates to an information processing device. The information processing device is mounted on a vehicle including a steering wheel and wheels each provided with a tire. The information processing device includes a processor. The processor is configured to calculate a feature quantity on flexibility of the tire when all of at least one condition is satisfied. The at least one condition includes at least one of a first condition and a second condition. The first condition is a condition that an absolute value of an angular velocity of the steering wheel is smaller than a first reference value, and the second condition is a condition that an absolute value of a vector sum of accelerations of the vehicle is smaller than a second reference value.

In the first aspect, the information processing device, the steering wheel, and the wheels may be included in a vehicle.

In the first aspect, the at least one condition may include both the first condition and the second condition.

In the first aspect, the at least one condition may further include a third condition that an absolute value of an angle of the steering wheel is smaller than a third reference value.

In the first aspect, the at least one condition may further include a fourth condition that velocity of the vehicle is within a predetermined range.

With the first aspect, since a feature quantity is calculated under a condition that a force applied to the tire is guaranteed to be within a certain range (i.e. the force applied to the tire does not fluctuate), a tire state change can be estimated with accuracy.

In the first aspect, the wheels may include a drive wheel and a driven wheel. The processor may be configured to calculate, as the feature quantity, a ratio of a rotation velocity ratio between the drive wheel and the driven wheel to acceleration in a longitudinal direction of the vehicle.

With the above configuration, changes in the state of the tire, particularly changes in flexibility, can be estimated with high accuracy.

In the first aspect, the processor may be configured to integrate a difference from an initial value of the ratio at predetermined timings, and output, when an integration result exceeds a first threshold, a signal indicating that a gradual change in the flexibility of the tire occurs.

With the above configuration, it is possible to specify what kind of change has occurred in the flexibility of the tire (i.e. whether the change is a gradual change or a rapid change).

In the first aspect, when a difference between a previous value and a current value of the ratio exceeds a second threshold, the processor may be configured to output a signal indicating that a rapid change in the flexibility of the tire occurs.

With the above configuration, it is possible to specify what kind of change has occurred in the flexibility of the tire (i.e. whether the change is a gradual change or a rapid change).

A second aspect of the present disclosure is an information processing method. The information processing method includes determining whether at least one condition is satisfied, and calculating a feature quantity on flexibility of a tire when all of the at least one condition is satisfied. The at least one condition includes at least one of a first condition and a second condition. The first condition is a condition that an absolute value of an angular velocity of a steering wheel is smaller than a first reference value, and the second condition is a condition that an absolute value of a vector sum of vehicle accelerations of a vehicle including the steering wheel and wheels each provided with the tire is smaller than a second reference value.

With the second aspect, similarly to the first aspect, the tire state change can be estimated with high accuracy.

A third aspect of the present disclosure is a non-transitory storage medium. The non-transitory storage medium storing instructions that are executable by one or more processors in a computer and that cause the one or more processors to perform functions. The functions includes determining whether at least one condition is satisfied, and calculating a feature quantity on flexibility of a tire when all of the at least one condition is satisfied. The at least one condition includes at least one of a first condition and a second condition. The first condition is a condition that an absolute value of an angular velocity of a steering wheel is smaller than a first reference value, and the second condition is a condition that an absolute value of a vector sum of vehicle accelerations of a vehicle including the steering wheel and wheels each provided with the tire is smaller than a second reference value.

With the third aspect, similarly to the first aspect, it is possible to estimate a tire state change with high accuracy.

With each aspect of the present disclosure, it is possible to estimate a tire state change with high accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
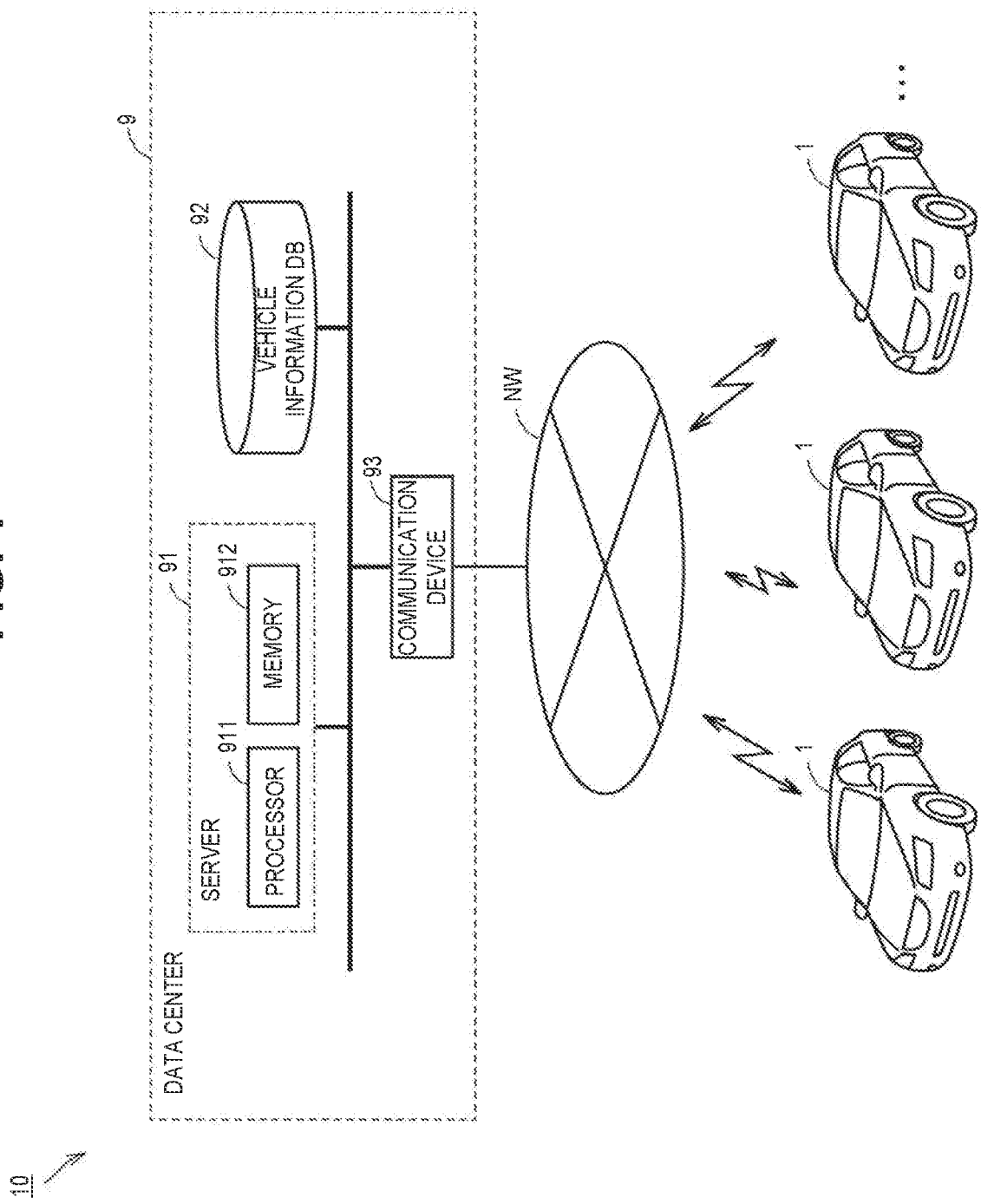
FIG. 1 is a diagram illustrating an overall configuration of a vehicle management system according to an embodiment of the present disclosure.

Hereinafter, embodiments will be described in detail with reference to the drawings. The same or corresponding parts in the drawings are denoted by the same reference numerals, and the description thereof will not be repeated.

EMBODIMENTS

Overall Configuration of System

FIG. 1 is a diagram illustrating an overall configuration of a vehicle management system according to an embodiment of the present disclosure. A vehicle management system 10 includes a plurality of vehicles 1 and a data center 9.

The vehicle 1 is, for example, a battery electric vehicle (BEV). However, the power source of the vehicle 1 is not particularly limited. The vehicle 1 may be a vehicle equipped with an engine (a so-called conventional vehicle), a hybrid electric vehicle (HEV), a plug-in hybrid electric vehicle (PHEV), or a fuel cell electric vehicle (FCEV). A configuration of vehicle 1 will be described in FIGS. 2 to 4.

The data center 9 manages data of a plurality of vehicles 1. The data center 9 is connected to allow two-way communication with the vehicles 1 via a communication network NW. The data center 9 collects data from each vehicle 1. The data center 9 also provides each vehicle 1 with necessary data (such as an update program) and transmits various commands to each vehicle 1. The data center 9 includes a server 91, a vehicle information database 92, and a communication device 93.

The server 91 is processing circuitry including a processor 911 and a memory 912. The server 91 collects data from each vehicle 1. The server 91 then processes the collected data and stores the processing results in the vehicle information database 92. The details of the data collected by the server 91 and processing by the server 91 will be described later. The communication device 93 realizes communication between the server 91 and the communication network NW.

Vehicle Configuration

Figure 2:
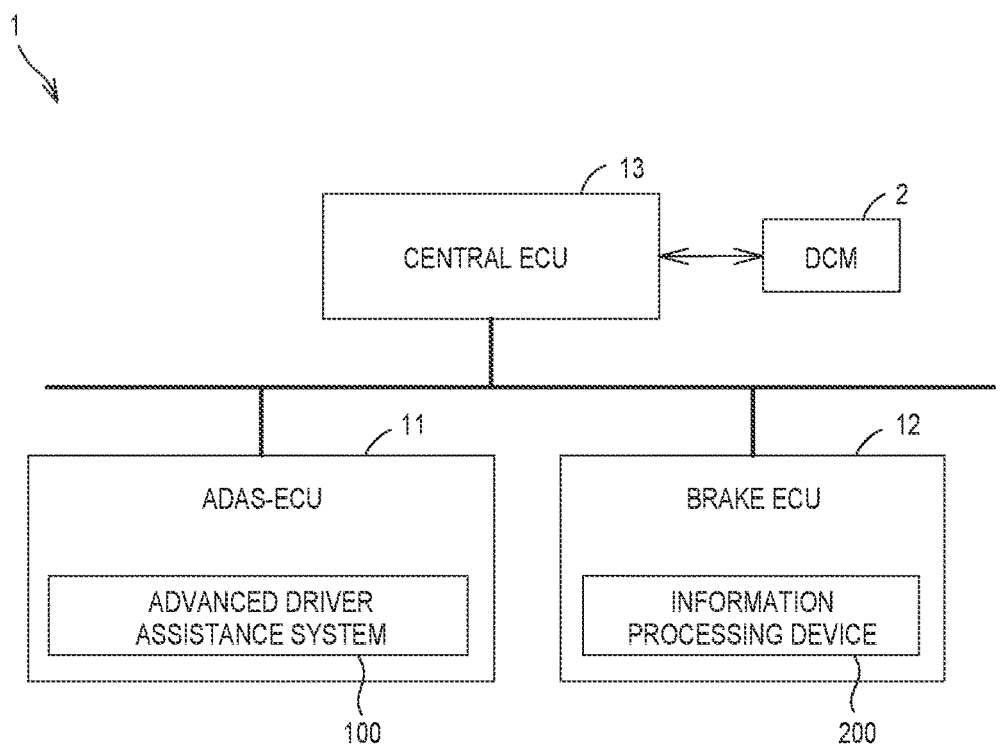
FIG. 2 is a diagram illustrating a configuration example of the vehicle.

FIG. 2 is a diagram illustrating a configuration example of the vehicle 1. The vehicle 1 includes an Advanced Driver Assistance System (ADAS)-Electronic Control Unit (ECU) 11, a brake ECU 12, a central ECU 13, and a Data Communication Module (DCM) 2. The ADAS-ECU 11, the brake ECU 12, and various ECUs (not shown) included in an actuator system 300, which will be described later, are communicably connected to the central ECU 13 via a communication bus such as a Controller Area Network (CAN). Alternatively, the central ECU 13 may have a gateway function that relays communication between ECUs.

Figure 4:
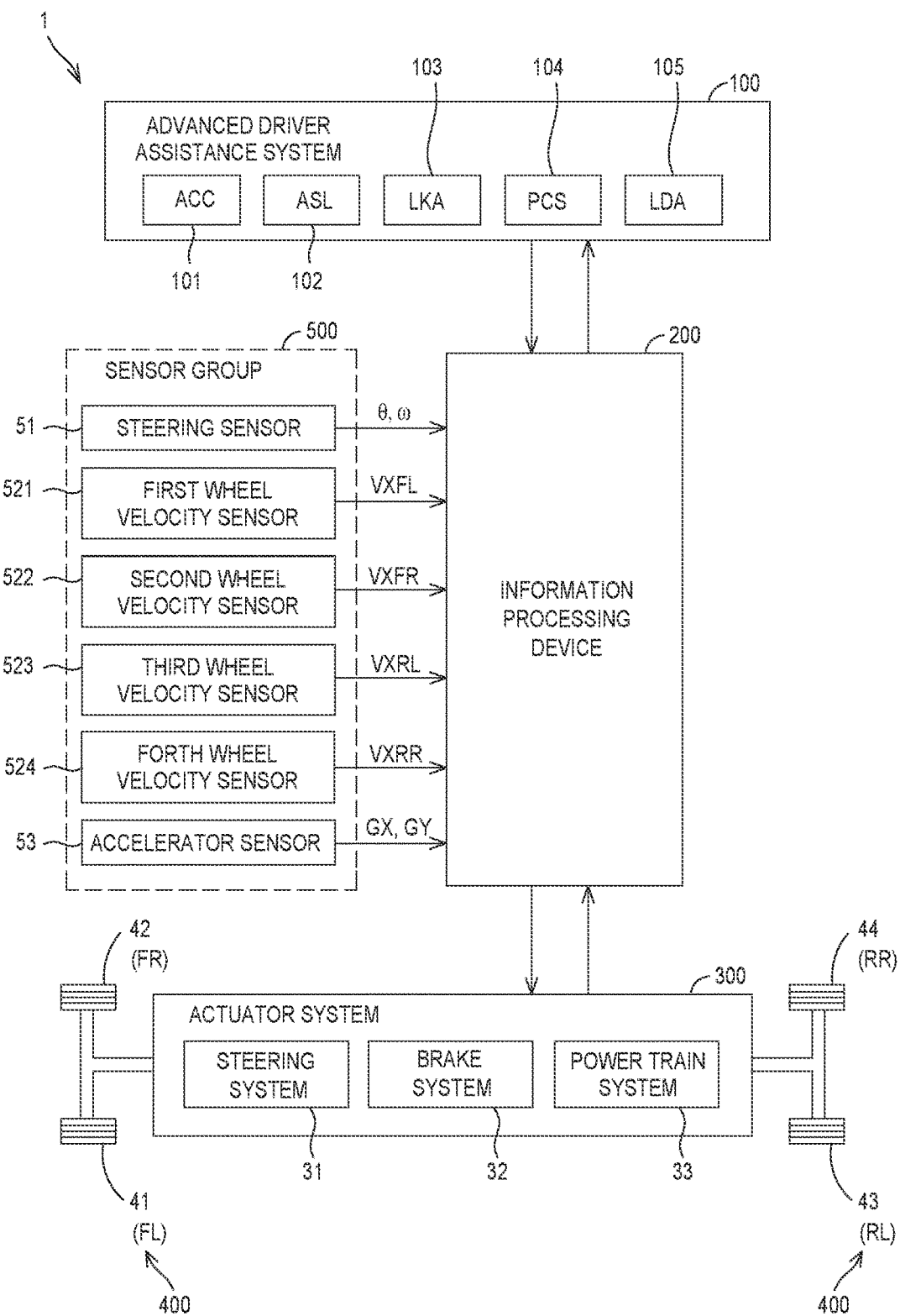
FIG. 4 is a diagram for describing a system included in the vehicle.

The ADAS-ECU 11 controls an advanced driver assistance system 100 (see FIG. 4). The advanced driver assistance system 100 is configured to implement various functions for assisting the driving of the vehicle 1.

The brake ECU 12 executes braking control of the vehicle 1. In this embodiment, the brake ECU 12 includes an information processing device 200. The information processing device 200 acquires various pieces of information from a motion manager that manages the motion of the vehicle and a vehicle stability control (VSC) system that stabilizes the attitude of the vehicle. The information processing device 200 requests the actuator system 300 to move the vehicle 1 according to a kinematic plan set in at least one of a plurality of applications of the advanced driver assistance system 100. A detailed configuration of the information processing device 200 will be described later.

The information processing device 200 may be implemented in another ECU (for example, a steering ECU or a motor generator ECU that is not shown) which is different from the brake ECU 12. Alternatively, the information processing device 200 may be implemented as a single ECU. The ECU (the brake ECU 12 in the present embodiment) on which the information processing device 200 is mounted is an example of the "information processing device" according to the present disclosure. An example of the "information processing device" according to the present disclosure may be the central ECU 13.

The central ECU 13 is communicably connected to the DCM 2. The DCM 2 is a communication module configured to wirelessly communicate with the outside via the communication network NW. As a result, two-way communication between the vehicle 1 and the data center 9 (see FIG. 1) is realized. In the present embodiment, the central ECU 13 transmits data received from ECUs, such as the brake ECU 12 to the data center 9 via the DCM 2.

The central ECU 13 includes a memory (not shown) in which programs are stored. The programs include programs (for example, an operating system and application programs) read from various ECUs when the system of the vehicle 1 is started. When receiving an update program from the data center 9, the central ECU 13 updates the program stored in the memory.

Figure 3:
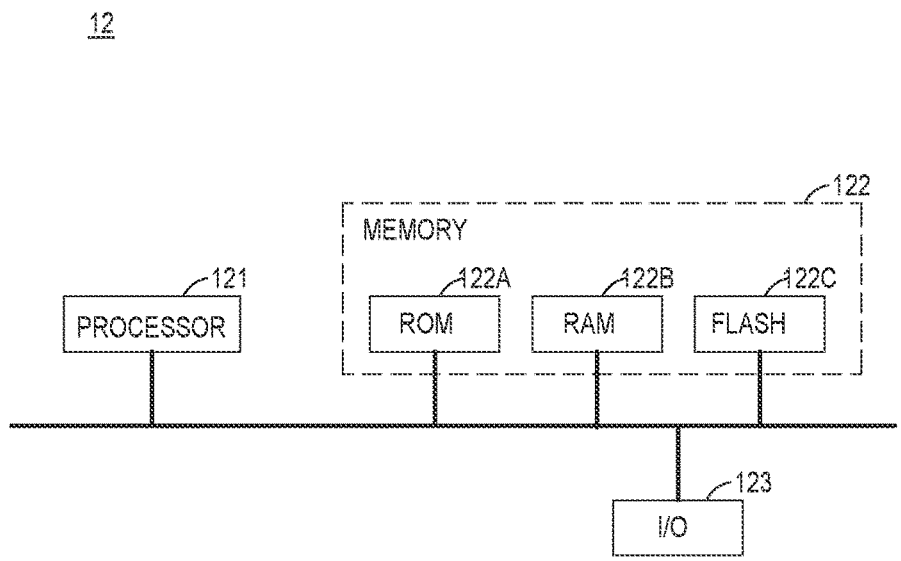
FIG. 3 is a block diagram illustrating a typical hardware configuration of a brake ECU.

FIG. 3 is a block diagram illustrating a typical hardware configuration of a brake ECU 12. The brake ECU 12 has a processor 121, a memory 122, and an input/output interface (I/O) 123. The processor 121 is, for example, a Central Processing Unit (CPU). The processor 121 executes various arithmetic processes according to programs. The memory 122 includes a Read Only Memory (ROM) 122A, a Random Access Memory (RAM) 122B, and a flash memory 122C. The memory 122 stores programs (for example, the operating system and the application programs) executed by the processor 121. The input/output interface 123 is configured to be able to exchange information with other ECUs. Although the description is not repeated, the hardware configuration of other ECUs is the same.

FIG. 4 is a diagram for describing a system included in the vehicle 1. The vehicle 1 further includes an actuator system 300, a plurality (four in this example) of wheels 400, and a sensor group 500. The information processing device 200 is connected to the advanced driver assistance system 100, the actuator system 300, and the sensor group 500.

The advanced driver assistance system 100 includes, for example, a follow-up run (ACC: Adaptive Cruise Control) 101, an automatic speed limiter (ASL) 102, lane keeping assist (LKA) 103, a collision damage mitigation braking (PCS: Pre-Crash Safety) 104, and a lane departure alert (LDA) 105. Although not shown, the advanced driver assistance system 100 may include an autonomous driving system (ADS).

The actuator system 300 includes a plurality of actuators and is configured to realize a motion request of the vehicle 1 outputted from the information processing device 200. The actuator system 300 includes, for example, a steering system 31, a brake system 32, and a power train system 33.

The steering system 31 includes, for example, a rack-and-pinion electric power steering (EPS: Electric Power Steering), and controls the steering angle (the steering wheel angle) of the steering wheel of the vehicle 1.

The brake system 32 controls a plurality of braking devices (not shown) provided on each wheel 400 of the vehicle 1. The braking devices include, for example, disc brake systems that operate using hydraulic pressure regulated by an actuator. The brake system 32 may include an electrical parking brake (EPB) (not shown) that locks wheels 400 by actuation of an actuator. The brake system 32 may include a parking (P) lock system (not shown) that controls a P lock device provided in the transmission of the vehicle 1.

The power train system 33 is configured to switch the shift range using a shift device (not shown), and to control the driving force of the vehicle 1 in the traveling direction using a motor generator (not shown). Drive wheels 41, 42 (described later) are rotated by the power train system 33 to apply a driving force to the vehicle 1 so that the vehicle 1 travels.

The four wheels 400 include the drive wheels 41, 42, and driven wheels 43, 44, for example. In this example, the front wheels are drive wheels and the rear wheels are driven wheels. However, the layout of the wheels is not limited to the front and rear being the drive wheel and the driven wheel.

The sensor group 500 detects a driving operation variable of the vehicle 1 and a traveling state variable of the vehicle 1. The sensor group 500 includes a steering sensor 51, first to fourth wheel velocity sensors 521 to 524, and an acceleration sensor 53, for example.

The steering sensor 51 detects, for example, the rotation angle of a pinion gear connected to the rotation shaft of the actuator as the steering wheel angle θ. The steering sensor 51 outputs the detected steering wheel angle θ to the information processing device 200. The steering sensor 51 detects the steering wheel angular velocity co and outputs the steering wheel angular velocity co to the information processing device 200.

The first wheel velocity sensor 521 detects a drive wheel velocity VXFL, which is the rotational velocity of the left front drive wheel 41. The second wheel velocity sensor 522 detects a drive wheel velocity VXFR, which is the rotational velocity of the right front drive wheel 42. The third wheel velocity sensor 523 detects a driven wheel velocity VXRL, which is the rotational velocity of the left rear driven wheel 43. The fourth wheel velocity sensor 524 detects a driven wheel velocity VXRR, which is the rotational velocity of the right rear driven wheel 44. Each wheel velocity sensor outputs the detected wheel velocity to the information processing device 200.

The acceleration sensor 53 includes a longitudinal acceleration sensor and a lateral acceleration sensor (neither shown). The longitudinal acceleration sensor detects an acceleration GX in the longitudinal direction of the vehicle 1 and outputs the detected acceleration GX to the information processing device 200. The lateral acceleration sensor detects an acceleration GY in the lateral direction of the vehicle 1 and outputs the detected acceleration GY to the information processing device 200. The information processing device 200 can calculate the vector sum of the accelerations GX and GY in both the longitudinal direction and the lateral direction. Hereinafter, the vector sum of accelerations will be referred to as "resultant acceleration G".

Although not shown, the sensor group 500 may further include other sensors, such as a camera, a millimeter wave radar, Laser Imaging Detection and Ranging (LiDAR), and a gyro sensor.

In this example, it has been described that all the sensors included in the sensor group 500 directly output their detection results to the information processing device 200. However, any one of these sensors may output the detection result to another ECU. The information processing device 200 may acquire the detection results of the sensors via the communication bus or the central ECU 13.

In the vehicle 1 configured as described above, the information processing device 200 uses data acquired from various sensors included in the sensor group 500 to estimate changes in a tire state. However, the state of the vehicle 1 can change significantly depending on various disturbances, the user's driving style, and the like. Noise caused by disturbances and driving style may reduce the accuracy of tire condition change estimation.

Therefore, in the present embodiment, the information processing device 200 estimates a tire state change when at least one predetermined condition (a plurality of conditions in the present embodiment) is all satisfied. More specifically, the information processing device 200 calculates a feature quantity on tire flexibility when all of the plurality of conditions is satisfied. These conditions are set assuming a driving situation in which the force applied to the tire is within a certain range. Although the details will be described later, in this way, it is possible to calculate the feature quantity after removing noise caused by disturbances, driving style, and the like. As a result, it becomes possible to estimate the tire state change with high accuracy.

Information Processing Device

Figure 5:
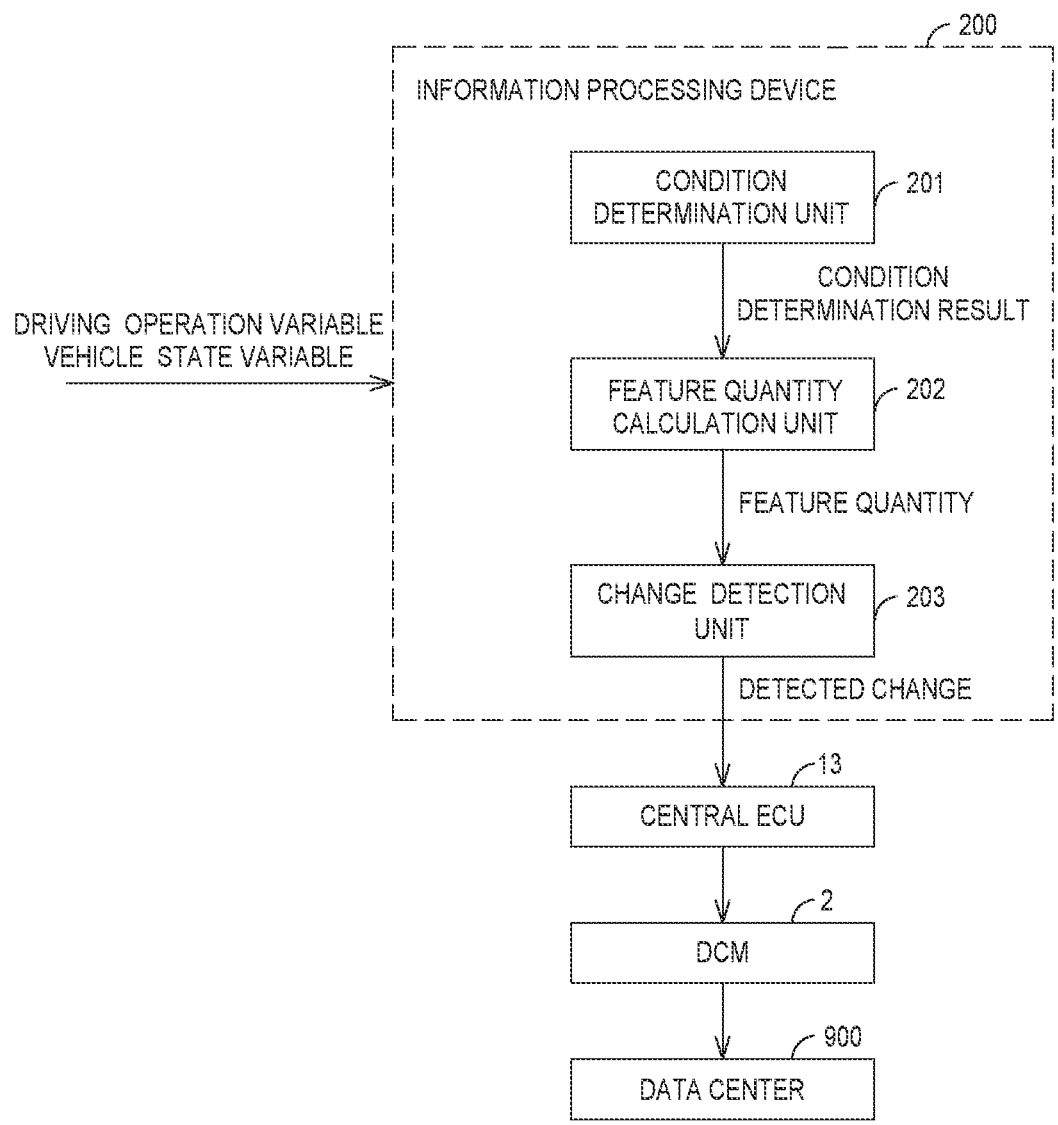
FIG. 5 is a diagram for describing an outline of processing by an information processing device.

FIG. 5 is a diagram for describing an outline of processing performed by the information processing device 200. The information processing device 200 includes, for example, a condition determination unit 201, a feature quantity calculation unit 202, and a change detection unit 203.

The condition determination unit 201 determines whether at least one condition (a plurality of conditions in this example) for calculating the feature quantity is satisfied based on the data regarding the driving operation variable and the data regarding the vehicle state quantity from the sensor group 500, the details of the conditions will be described later with reference to FIG. 6. The condition determination unit 201 outputs the condition determination result to the feature quantity calculation unit 202.

The feature quantity calculation unit 202 calculates a feature quantity on tire flexibility using data on the driving operation variable and data on a vehicle state quantity when the conditions for calculating a feature quantity are satisfied. The calculation method of the feature quantity will be described later with reference to FIGS. 6 and 7. The feature quantity calculation unit 202 outputs the calculated feature quantity to the change detection unit 203.

The change detection unit 203 detects a change in the state of the tire based on the feature quantity on the tire flexibility. The detection method of a tire condition change will be described later with reference to FIGS. 6, 8, and 9. The change detection unit 203 outputs data indicating the detected change in tire state to the central ECU 13.

The central ECU 13 transmits data indicating changes in tire condition to the data center 9 via the DCM 2. As a result, the data is accumulated in the vehicle information database 92 in the data center 9.

Figure 6:
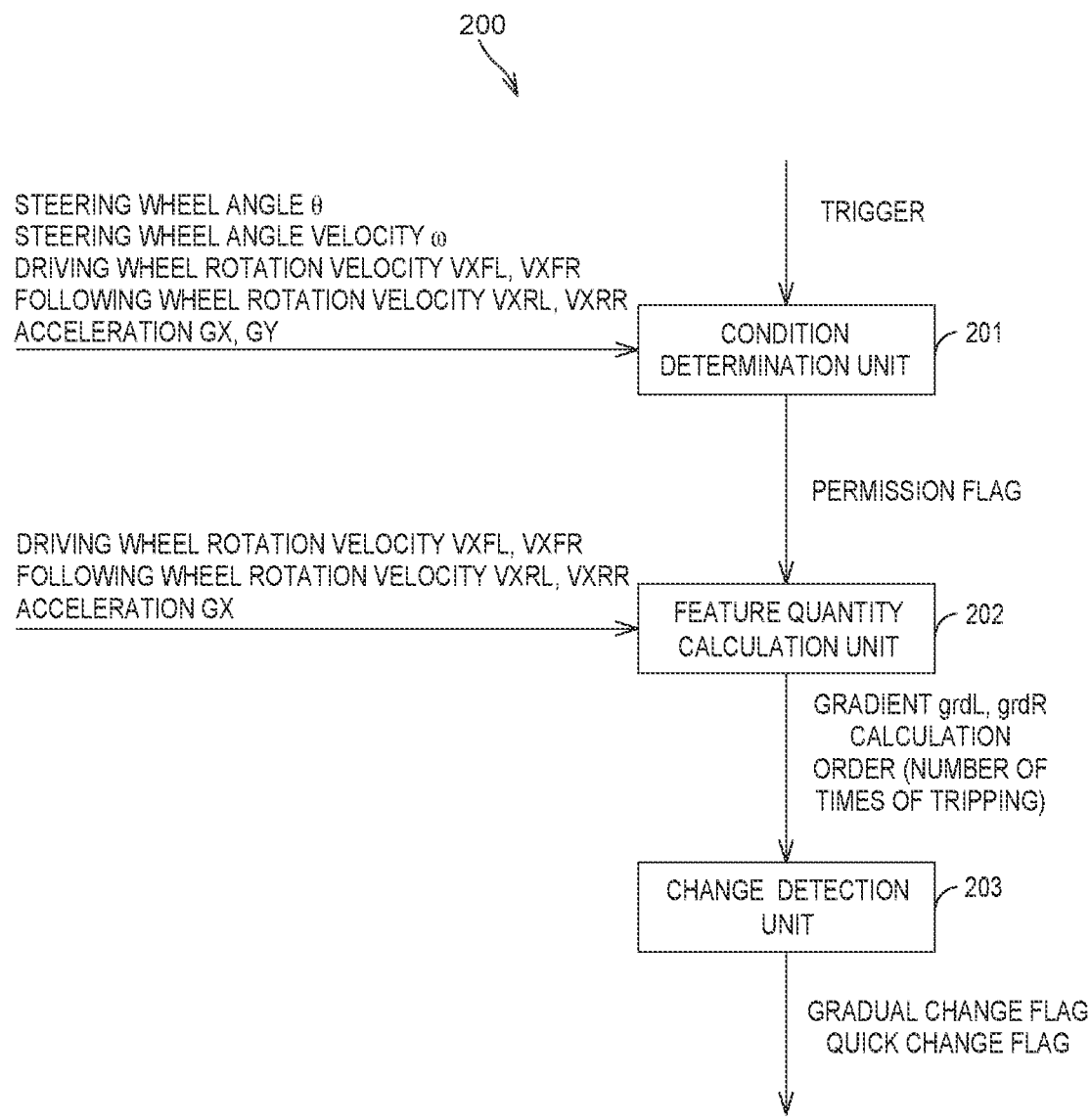
FIG. 6 is a functional block diagram of the information processing device.

FIG. 6 is a functional block diagram of the information processing device 200.

Determination of Condition

The condition determination unit 201 receives, from the sensor group 500, the steering wheel angle θ and the steering wheel angular velocity ω as data on the quantity of the driving operation variable, and four wheel velocities (drive wheel rotation velocities VXFL, VXFR and driven wheel rotation velocities VXRL, VXRR) and accelerations GX, GY as data on the vehicle state variable. Upon receiving a trigger signal (for example, a signal indicating the elapse of the control cycle), the condition determination unit 201 determines whether the conditions for calculating the feature quantity are satisfied based on these pieces of data. More specifically, the condition determination unit 201 determines whether the following four conditions are satisfied in this example.

The condition determination unit 201 determines whether the velocity (vehicle velocity) V of the vehicle 1 is within the range defined by an upper limit value UL and a lower limit value LL (see formula (1) below). As an example, the lower limit value LL is 30 [km/h] and the upper limit value UL is 70 [km/h]. When this condition is satisfied, the vehicle 1 is traveling at low or medium velocity.

$$LL \leq V \leq UL \quad (1)$$

The condition determination unit 201 can calculate the vehicle velocity V by a known method. For example, the condition determination unit 201 may calculate the vehicle velocity V from a specific wheel velocity out of four wheel velocities. Alternatively, the condition determination unit 201 may calculate the vehicle velocity V from the rotational velocity of a drive shaft (not shown).

The condition determination unit 201 determines whether the absolute value of the steering wheel angle θ is equal to or less than a predetermined reference value θref (see formula (2) below). When this condition is satisfied, the vehicle 1 is traveling straight or making a gentle turn.

$$|\theta| \leq \theta ref \quad (2)$$

The condition determination unit 201 determines whether the absolute value of the steering wheel angular velocity ω is equal to or less than a predetermined reference value ωref (see formula (3) below). When this condition is satisfied, the vehicle 1 is traveling straight or turning at a substantially constant angular velocity (during uniform circular motion).

$$|\omega| \leq \omega ref \quad (3)$$

The condition determination unit 201 determines whether the absolute value of the resultant acceleration G is equal to or less than a predetermined reference value Gref (see formula (4) below). The reference value Gref may be a small value, such as 1 [m/s²]. When this condition is satisfied, the vehicle 1 is traveling at low or medium velocity.

$$|G| \leq Gref \quad (4)$$

The above four conditions can be classified into three attributes. The condition regarding the vehicle velocity V (formula (1)) is a precondition. The condition regarding the steering wheel angle θ (formula (2)) and the condition regarding the steering wheel angular velocity ω (formula (3)) are inputs (causes). The condition (formula (4)) regarding the resultant acceleration G is a response (result). In particular, the steering wheel angular velocity ω represents a variation of the input. When the steering wheel angular velocity ω changes, the force applied to the tire changes, and the resultant acceleration G changes as a response. Therefore, the conditions regarding the steering wheel angular velocity ω and the conditions regarding the resultant acceleration G are important for determining whether the force applied to the tire is fluctuating or constant.

When formulas (1) to (4) are all satisfied, the condition determination unit 201 turns on a permission flag that permits calculation of the feature quantity. On the other hand, when at least one of formulas (1) to (4) is not satisfied, the condition determination unit 201 turns off the permission flag. The condition determination unit 201 outputs a signal indicating ON/OFF of the permission flag to the feature quantity calculation unit 202.

Calculation of Feature Quantity

When the permission flag is ON, the feature quantity calculation unit 202 calculates the gradients grdL, grdR as a feature quantity based on the drive wheel rotation velocities VXFL, VXFR, the driven wheel rotation velocities VXRL, VXRR, and the longitudinal acceleration GX. The gradient grdL is a feature quantity on the left tires (the drive wheel 41 and the driven wheel 43). The gradient grdR is a feature quantity on the right tires (the drive wheel 42 and the driven wheel 44).

Figure 7:
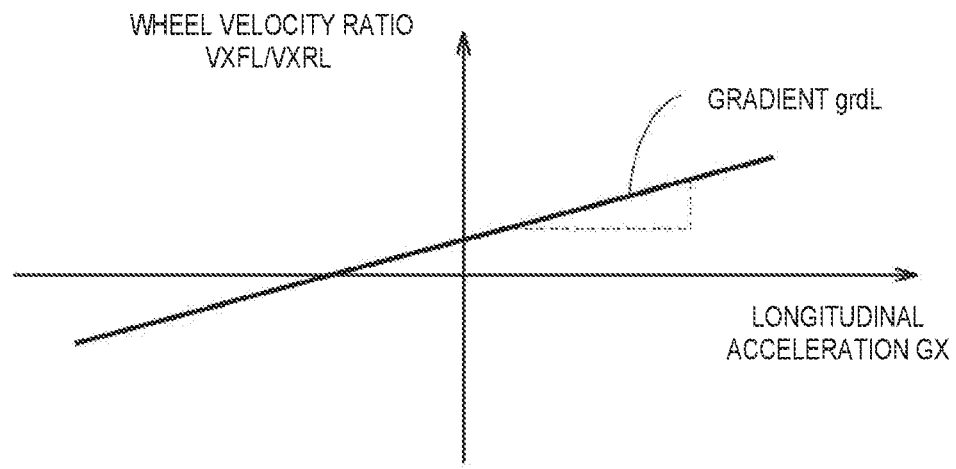
FIG. 7 is a diagram for describing a gradient.

FIG. 7 is a diagram for describing the gradient grdL. The horizontal axis represents the longitudinal acceleration GX. The vertical axis represents the left wheel velocity ratio SL. The wheel velocity ratio SL is the rotational velocity ratio VXFL/VXRL between the drive wheels 41 and the driven wheels 43. The SL may be set to VXFL/VXRL−1 such that the wheel velocity ratio SL becomes zero when VXFL=VXRL.

During acceleration, the drive wheel rotational velocity VXFL is higher than the driven wheel rotational velocity VXRL (VXFL/VXRL>1), and during deceleration, the drive wheel rotational velocity VXFL is lower than the driven wheel rotational velocity VXRL (VXFL/VXRL<1). Therefore, the relationship between the longitudinal acceleration GX and the wheel velocity ratio SL is one that increases linearly as illustrated in FIG. 7.

The feature quantity calculation unit 202 calculates the ratio of the left wheel velocity ratio SL (=VXFL/VXRL) to the longitudinal acceleration GX as the gradient grdL, as illustrated in the following formula (5). The gradient may be referred to as a slope of a straight line.

$$grdL = SL/GX \quad (5)$$

Although not shown, the feature quantity calculation unit 202 calculates the gradient grdR in a similar manner. The gradient grdR is the ratio of the right wheel velocity ratio SR (=VXFR/VXRR) to the longitudinal acceleration GX (see formula (6) below). The gradients grdL, grdR are examples of the "ratio" according to the present disclosure.

$$grdR = SR/GX \quad (6)$$

When a straight line (F=kx (k: spring constant)) representing Hooke's law is plotted on a graph with a deformation quantity x of the spring on the horizontal axis and an elastic force F of a spring on the vertical axis, the slope of the straight line represents a spring constant k. The greater the slope, the greater the spring constant k, that is, the stiffer the spring. This analogy is used to conceptually describe the physical meaning of gradients.

When a mass m is constant in an equation of motion (F=ma), an acceleration a and a force F are in a proportional relationship, so the acceleration can be read as a force. For that reason, the acceleration GX on the horizontal axis of FIG. 7 is considered to represent a longitudinal force applied to a contact patch of the tire. On the other hand, a difference in rotational velocity between the drive wheels and the driven wheels is caused by a slip of the wheels (mainly the drive wheels). A wheel that is slipping stretches more than it would otherwise. From this, it is considered that the wheel velocity ratio SR on the vertical axis represents a deformation amount of the tire in the rotational direction. Therefore, from the spring analogy above, the gradient in FIG. 7 can be said to be a parameter on tire stiffness, such as the spring constant. However, in FIG. 7 and the graph illustrating Hooke's law, the relationship between the vertical axis and the horizontal axis is reversed. Therefore, a large gradient of the tire of FIG. 7 means that the tire has a high degree of flexibility. As the deterioration of the tire progresses and the tire flexibility decreases, the gradient becomes smaller.

When the acceleration GX is small in the forward direction (for example, 0.975<GX<1.025), when SL>SLPmax, SL may be set to be equal to SLPmax, and when SL<SLPmin, SL may set to be equal to SLPmin. When the acceleration GX is small in the backward direction (for example, −1.025<GX<−0.975), SL may be set to be SLNmax when SL>SLNmax, and SL may be set to be SLNmin when SL<SLNmin. Then, the maximum gradient value grdLmax=(SLPmax−SLNmin) and the minimum gradient value grdLmin=(SLPmin−SLNmax). The feature quantity calculation unit 202 may calculate a value between the maximum value grdLmax and the minimum value grdLmin of the gradient as the gradient grdL.

Returning to FIG. 6, the feature quantity calculation unit 202 stores the calculated feature quantities (gradients grdL, grdR) in the memory 122 in association with the order of calculation. In this example, the number of trips of the vehicle 1 is used as the calculation order. A feature quantity is calculated, for example, once per trip. However, the feature quantity calculation unit 202 may calculate the feature quantity with one trip a plurality of number of times, or may calculate the feature quantity with a plurality of number of times of trips once. Alternatively, the feature quantity calculation unit 202 may calculate the feature quantity each time a specified time elapses, or may calculate the feature quantity each time the vehicle 1 travels a specified distance. The feature quantity calculation unit 202 outputs the calculated gradients grdL, grdR and the number of times of trips to the change detection unit 203.

Detection of Change

The change detection unit 203 detects a change in tire flexibility based on the gradients grdL, grdR. More specifically, the change detection unit 203 detects a change in flexibility of the left tire based on gradient grdL, and detects a change in flexibility of the right tire based on gradient grdR. Changes in tire flexibility may include gradual changes in tire flexibility that are expected to occur due to tire wear and the like, and rapid changes in tire flexibility that are expected to occur due to tire replacement and the like.

Figure 8:
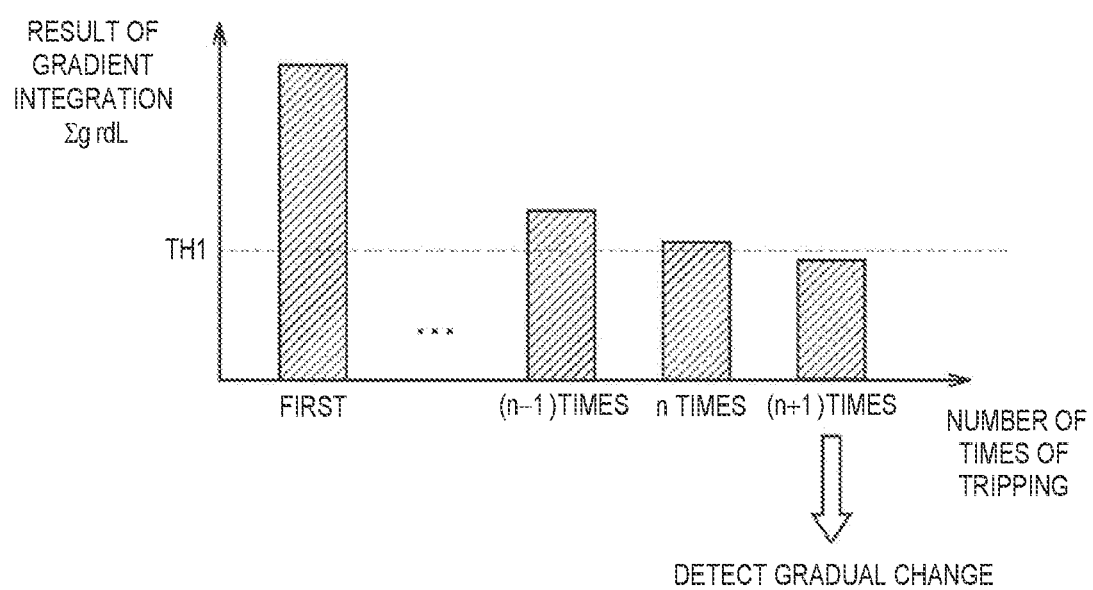
FIG. 8 is a diagram for describing a detection method of a gradual change of tire flexibility.

FIG. 8 is a diagram for describing a detection method of a gradual change of tire flexibility. The horizontal axis represents the number of times of trips. The vertical axis represents the result of gradient integration (gradient grdL or gradient grdR).

The change detection unit 203 executes arithmetic processing regarding the gradient grdL and arithmetic processing regarding the gradient grdR separately. The calculation process for the gradient grdL will be described below as an example, but the same applies to the calculation process for the gradient grdR.

The change detection unit 203 stores an initial value of the gradient grdL (the gradient at a first trip) grdL(0). For each trip, the change detection unit 203 integrates the difference (grdL(n)−grdL(0)) (usually a negative value) between a current value grdL(n) of the gradient and the initial value grdL(0) of the gradient into the previous gradient integration result. Then, the change detection unit 203 determines whether the gradient integration result $\Sigma grdL$ is equal to or less than a first threshold TH1 (see formula (7) below).

$$\Sigma grdL \leq TH1 \tag{7}$$

Although the first threshold TH1 may be a fixed value, the first threshold TH1 may be set according to the initial value grdL(n) of the gradient. For example, $\alpha$ times ($\alpha<1$) the initial value grdL(n) of the gradient can be set as the first threshold TH1.

When the gradient integration result $\Sigma grdL$ is equal to or less than the first threshold TH1, the change detection unit 203 determines that the left tire flexibility has gradually changed, and switches a gradual change detection flag to ON. On the other hand, when the gradient integration result $\Sigma grdL$ exceeds the first threshold TH1, the change detection unit 203 determines that the left tire flexibility has not gradually changed, and maintains the gradual change detection flag OFF. The change detection unit 203 outputs a signal indicating ON/OFF of the gradual change detection flag to the central ECU 13.

Figure 9:
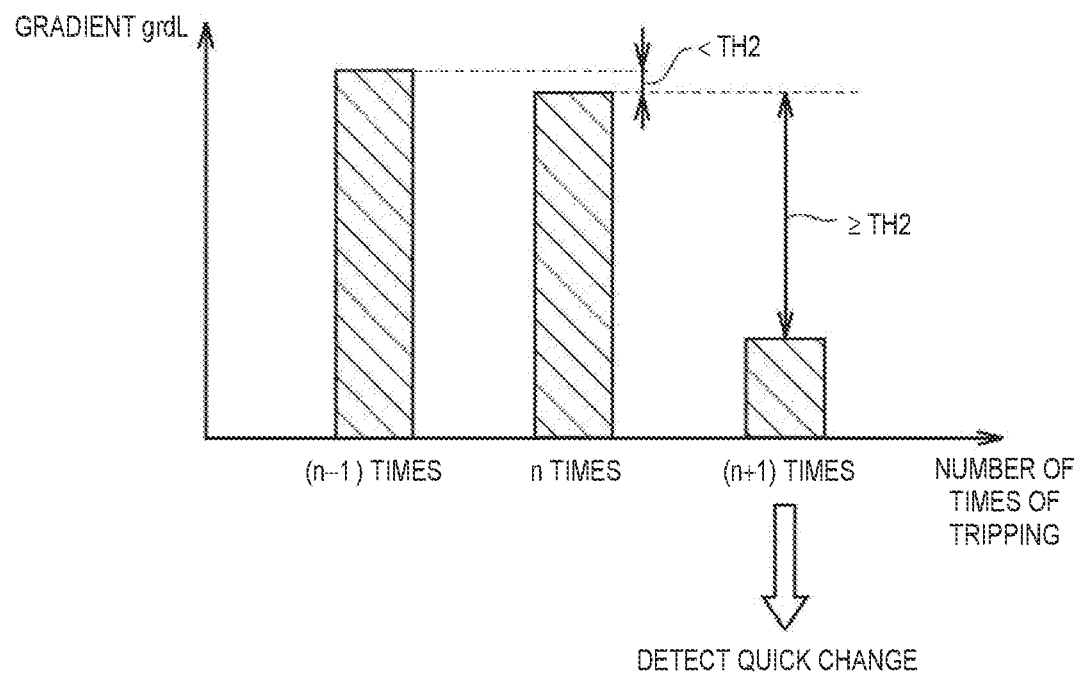
FIG. 9 is a diagram for describing the detection method of a rapid change of tire flexibility.

FIG. 9 is a diagram for describing a detection method of a rapid change of tire flexibility. The horizontal axis represents the number of times of trips. The vertical axis represents the gradient (gradient grdL or gradient grdR). Although the gradient grdL will be described here as an example, the same applies to the gradient grdR.

The change detection unit 203 stores, for each trip, the gradient grdL immediately after the start of the trip, for example. The change detection unit 203 determines whether the difference $\Delta grdL = grdL(n) - grdL(n-1)$ between the current value grdL(n) and the previous value grdL(n−1) of the gradient is equal to or greater than a second threshold TH2 (see formula (8) below)).

$$\Delta grdL \geq TH2 \tag{8}$$

When a difference $\Delta grdL$ is equal to or greater than the second threshold TH2, the change detection unit 203 determines that the rapid change in the left tire flexibility has occurred, and switches a rapid change detection flag to ON. On the other hand, when the difference $\Delta grdL$ is less than the second threshold TH2, the change detection unit 203 determines that the left tire flexibility has not rapidly changed, and maintains the rapid change detection flag OFF. The change detection unit 203 outputs a signal indicating ON/OFF of the rapid change detection flag to the central ECU 13.

Referring back to FIG. 5, the central ECU 13 transmits the data (gradual change detection flag and rapid change detection flag) received from the change detection unit 203 to the data center 9 via the DCM 2. The data transmitted from the DCM 2 to the data center 9 may further include the gradients grdL, grdR, which are feature quantities, and may also include the gradient integration result. These pieces of data are preferably associated with processing times. The data center 9 accumulates these pieces of data in the vehicle information database 92 as pieces of collective data that are associated with each other. As a result, the data center 9 can acquire statistics regarding changes in the state of each tire of the vehicles 1. Specifically, when the gradual change detection flag is turned on, the data center 9 can determine that the state change (deterioration) of the tire has occurred. Further, when the rapid change detection flag is turned on, the data center 9 can determine that the tire change has occurred. The data center 9 can also use the statistics as statistics for changes in driving behavior characteristics of the driver.

Processing Flow

Figure 10:
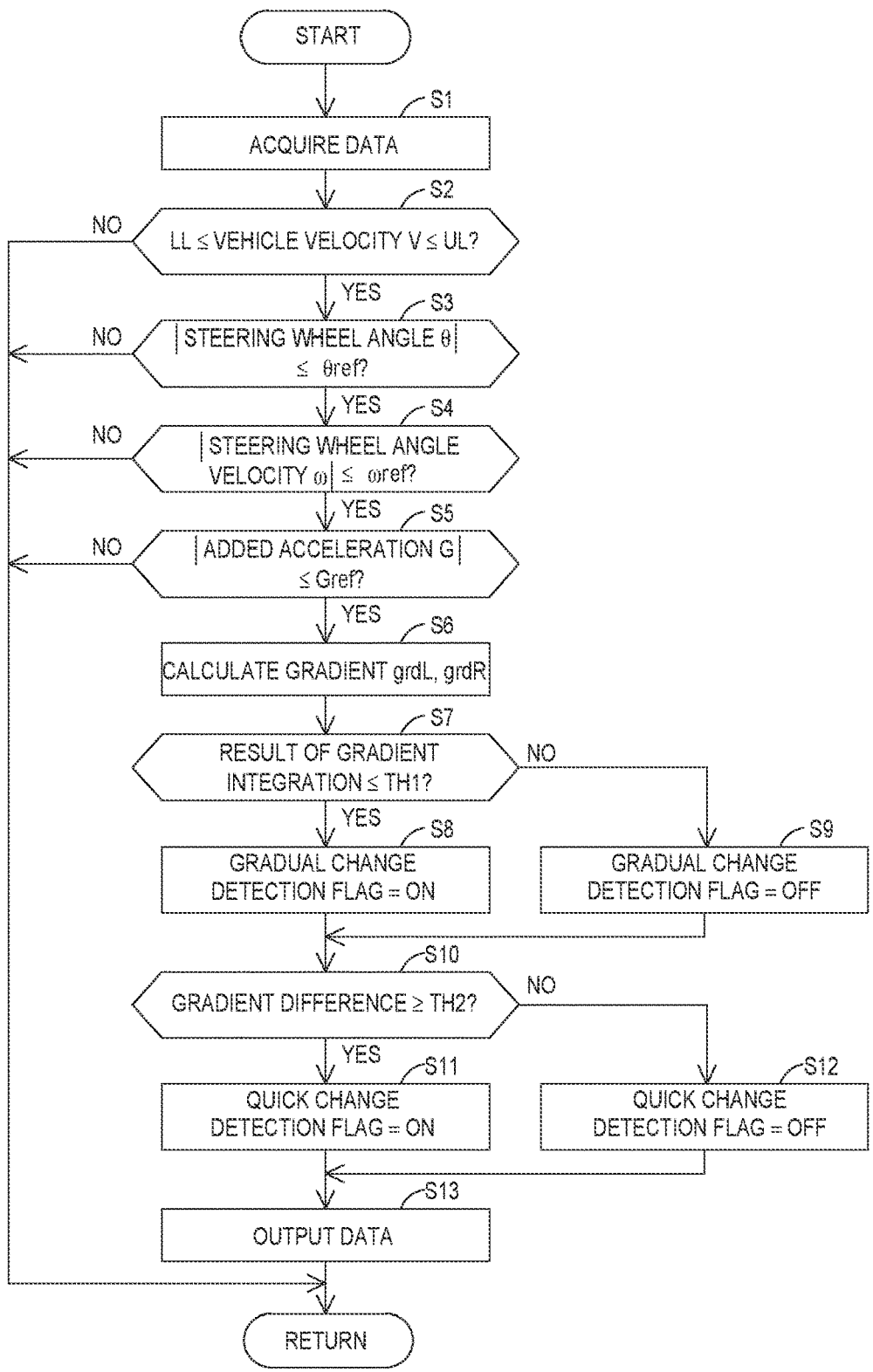
FIG. 10 is a flowchart illustrating a flow of processing by an information processing device.

FIG. 10 is a flowchart illustrating a flow of processing by the information processing device 200. A series of processes illustrated in this flowchart are repeatedly executed by the brake ECU 12 in each predetermined control cycle in the present embodiment. Each step is implemented by software processing by the brake ECU 12, but may be implemented by hardware processing by an electric circuit arranged within the brake ECU 12. Hereinafter, the step will also be abbreviated as S.

In S1, the brake ECU 12 acquires data from the sensor group 500. Specifically, the brake ECU 12 acquires the steering wheel angle θ, the steering wheel angular velocity ω, the drive wheel rotation velocities VXFL, VXFR, the driven wheel rotation velocities VXRL, VXRR, the longitudinal acceleration GX, and the lateral acceleration GY.

In S2 to S5, the brake ECU 12 determines whether four conditions for calculating the feature quantity are satisfied. Specifically, in S2, the brake ECU 12 determines whether the vehicle velocity V is within the range between the lower limit value LL and the upper limit value UL (see formula (1) for an example of the fourth condition according to the present disclosure). In S3, the brake ECU 12 determines whether the absolute value of the steering wheel angle θ is equal to or less than the reference value θref (see formula (2), an example of the third condition according to the present disclosure). In S4, the brake ECU 12 determines whether the absolute value of the steering wheel angular velocity ω is equal to or less than the reference value ωref (see formula (3), an example of the first condition according to the present disclosure). In S5, the brake ECU 12 determines whether the absolute value of the resultant acceleration G is equal to or less than the reference value Gref (see formula (4), an example of the second condition according to the present disclosure). The order of steps S2 to S5 can be changed.

When all of the conditions of S2 to S5 are satisfied (YES in S2, YES in S3, YES in S4, and YES in S5), the brake ECU 12 advances the process to S6. On the other hand, when at least one of the conditions S2 to S5 is not satisfied (NO in S2, NO in S3, NO in S4, or NO in S5), the brake ECU 12 does not execute the subsequent steps, and ends the process without executing the steps thereafter.

All steps S2 to S5 are not essential. The brake ECU 12 may execute at least one of steps S4 and S5. However, by executing both steps S4 and S5, it is possible to more reliably guarantee that the force applied to the tire is within a certain range (the force applied to the tire does not fluctuate). Further, by executing one or both of steps S2 and S3 in addition to steps S4 and S5, it is possible to more reliably guarantee that the force applied to the tire is within a certain range. As a result, it is possible to improve the estimation accuracy of the tire state change.

In S6, the brake ECU 12 calculates the left gradient grdL and the right gradient grdR, which are characteristic quantities. Since the method of calculating the gradients grdL, grdR has already been described in detail in FIG. 7, the description thereof will not be repeated here. The brake ECU 12 stores the calculated gradients grdL, grdR in the memory 122 in association with the corresponding times. The following steps S7 to S12 are executed separately for the left gradient grdL and the right gradient grdR. The left gradient grdL will be representatively described below.

In S7, the brake ECU 12 calculates the integration result ΣgrdL of the gradient calculated in S6. Then, the brake ECU 12 determines whether the gradient integration result ΣgrdL is equal to or less than the first threshold TH1. Since these processes have already been described earlier when referencing FIG. 8, the description thereof will not be repeated. When the gradient integration result ΣgrdL is less than or equal to the first threshold TH1 (YES in S7), the brake ECU 12 turns on the gradual change detection flag (S8), while the gradient integration result ΣgrdL is greater than the first threshold TH1 (NO in S7), the gradual change detection flag is turned off (S9).

In S10, the brake ECU 12 calculates the integrated result ΣgrdL of the gradient calculated in S6. Then, the brake ECU 12 determines whether the gradient difference ΔgrdL is greater than the second threshold TH2. Since these processes are described in FIG. 9, the description thereof will not be repeated. When the gradient difference ΔgrdL is equal to or greater than the second threshold TH2 (YES in S10), the brake ECU 12 turns on the rapid change detection flag (S11), and when the gradient difference ΔgrdL is less than the second threshold TH2 (NO in S10), the rapid change detection flag is turned off (S12).

In S13, the brake ECU 12 outputs flags (the on/off of gradual change detection flag and the on/off of rapid change detection flag) and the feature quantities (gradients grdL, grdR) together with the order of calculation (for example, the number of times of trips, time stamp, and mileage) together with the output to the central ECU 13. The brake ECU 12 may further output the gradient integration result ΣgrdL and/or the gradient difference ΔgrdL. As such, a series of processes ends.

As described above, in the present embodiment, four conditions can be taken into consideration when calculating the feature quantities (gradients grdL, grdR). The four conditions are the conditions that the absolute value of the steering wheel angle θ, the steering wheel angular velocity ω, the vehicle velocity V, and a vector sum of the accelerator (combined acceleration) G are smaller than the predetermined reference values, respectively (or are within the predetermined reference ranges, respectively). When these conditions are satisfied, since the force applied to the tire does not fluctuate (substantially constant), it is possible to calculate the gradients grdL, grdR without being affected by noise caused by disturbances, driving style, and the like. With this embodiment, it is possible to estimate a tire state change with high accuracy.

The embodiments disclosed this time should be considered to be illustrative in all respects and not restrictive. The scope of the present disclosure is indicated by the scope of claims rather than the description of the above-described embodiments, and is intended to include all modifications within the scope and meaning equivalent to the scope of the claims.

What is claimed is:

1. A vehicle comprising:
a steering wheel;
a plurality of wheels having tires, at least some of the plurality of wheels being turned by the steering wheel;
a steering sensor configured to detect a rotation angle of a rotation shaft attached to the steering wheel;
an acceleration sensor configured to detect longitudinal and lateral accelerations of the vehicle;
wheel velocity sensors configured to detect a rotational velocity of each of the plurality of wheels; and
an information processing device mounted on the vehicle, the information processing device including a processor configured to calculate a feature quantity on flexibility of the tires when all of at least one condition is satisfied, wherein:
the at least one condition includes at least one of a first condition and a second condition;
the first condition is a condition that an absolute value of an angular velocity of the steering wheel, detected by the steering sensor, is smaller than a first reference value;
the second condition is a condition that an absolute value of a vector sum of accelerations of the vehicle, detected by the acceleration sensor, is smaller than a second reference value,
the plurality of wheels includes a drive wheel and a driven wheel, and
the processor is further configured to:
calculate, as the feature quantity, a ratio of (i) a rotation velocity ratio between the drive wheel and the driven wheel, based on wheel velocities of the drive wheel and the driven wheel detected by the wheel velocity sensors, to (ii) acceleration in a longitudinal direction of the vehicle detected by the acceleration sensor, the ratio decreasing as the tire flexibility decreases;
integrate, at predetermined timings, a difference between an initial value of the ratio initially determined for the tires and a most-recently calculated value of the ratio most-recently determined for the tires; and
output, when an integration result is equal to or less than a first threshold, a signal indicating that a gradual change in the flexibility of the tire has occurred.

2. The vehicle according to claim 1, wherein the processor is further configured to output, when a difference between an immediately previous value of the ratio and the most-recently calculated value of the ratio exceeds a second threshold, a signal indicating that a rapid change in the flexibility of the tire has occurred.

3. The vehicle according to claim 1, wherein the at least one condition includes both the first condition and the second condition.

4. The vehicle according to claim 3, wherein the at least one condition further includes a third condition that an absolute value of an angle of the steering wheel, detected by the steering sensor, is smaller than a third reference value.

5. The vehicle according to claim 4, wherein the at least one condition further includes a fourth condition that velocity of the vehicle, detected by the wheel sensors, is within a predetermined range.

6. A method executed by a processor mounted in a vehicle having (a) a steering wheel, (b) a plurality of wheels having tires, at least some of the plurality of wheels being turned by the steering wheel, (c) a steering sensor configured to detect a rotation angle of a rotation shaft attached to the steering wheel, (d) an acceleration sensor configured to detect longitudinal and lateral accelerations of the vehicle, and (e) wheel velocity sensors configured to detect a rotational velocity of each of the plurality of wheels, the method comprising:
determining whether at least one condition is satisfied;
calculating a feature quantity on flexibility of the tires when all of the at least one condition is satisfied, wherein
the at least one condition includes at least one of a first condition and a second condition,
the first condition is a condition that an absolute value of an angular velocity of the steering wheel, detected by the steering sensor, is smaller than a first reference value,
the second condition is a condition that an absolute value of a vector sum of vehicle accelerations of the vehicle, detected by the acceleration sensor, is smaller than a second reference value,
the plurality of wheels includes a drive wheel and a driven wheel, and
the method further comprising:
calculating, as the feature quantity, a ratio of (i) a rotation velocity ratio between the drive wheel and the driven wheel, based on wheel velocities of the drive wheel and the driven wheel detected by the wheel velocity sensors, to (ii) acceleration in a longitudinal direction of the vehicle detected by the acceleration sensor, the ratio decreasing as the tire flexibility decreases;
integrating, at predetermined timings, a difference between an initial value of the ratio initially determined for the tires and a most-recently calculated value of the ratio most-recently determined for the tires; and
outputting, when an integration result is equal to or less than a first threshold, a signal indicating that a gradual change in the flexibility of the tire has occurred.

7. A non-transitory storage medium storing instructions that are executable by one or more processors mounted in a vehicle having (a) a steering wheel, (b) a plurality of wheels having tires, at least some of the plurality of wheels being turned by the steering wheel, (c) a steering sensor configured to detect a rotation angle of a rotation shaft attached to the steering wheel, (d) an acceleration sensor configured to detect longitudinal and lateral accelerations of the vehicle, and (e) wheel velocity sensors configured to detect a rotational velocity of each of the plurality of wheels, the instructions causing the one or more processors to perform functions comprising:
determining whether at least one condition is satisfied;
calculating a feature quantity on flexibility of the tires when all of the at least one condition is satisfied, wherein
the at least one condition includes at least one of a first condition and a second condition,
the first condition is a condition that an absolute value of an angular velocity of the steering wheel, detected by the steering sensor, is smaller than a first reference value,
the second condition is a condition that an absolute value of a vector sum of vehicle accelerations of the vehicle, detected by the acceleration sensor, is smaller than a second reference value, the plurality of wheels includes a drive wheel and a driven wheel, and the functions further comprise:

calculating, as the feature quantity, a ratio of (i) a rotation velocity ratio between the drive wheel and the driven wheel, based on wheel velocities of the drive wheel and the driven wheel detected by the wheel velocity sensors, to (ii) acceleration in a longitudinal direction of the vehicle detected by the acceleration sensor, the ratio decreasing as the tire flexibility decreases;

integrating, at predetermined timings, a difference between an initial value of the ratio initially determined for the tires and a most-recently calculated value of the ratio most-recently determined for the tires; and outputting, when an integration result is equal to or less than a first threshold, a signal indicating that a gradual change in the flexibility of the tire has occurred.

\* \* \* \* \*